(12) United States Patent
Kiga et al.

(10) Patent No.: US 6,377,317 B1
(45) Date of Patent: Apr. 23, 2002

(54) METHOD AND APPARATUS FOR CORRECTING COLOR COMPONENT FOCUSING IN A REAR-PROJECTION TELEVISION SET

(75) Inventors: Hirohide Kiga, Greensburg; Thomas A. Marflak; David S. Arnold, both of Huntingdon, all of PA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/288,078

(22) Filed: Apr. 8, 1999

(51) Int. Cl.[7] .................................................. H04N 9/30
(52) U.S. Cl. ...................................... 348/745; 348/778
(58) Field of Search ................................. 348/745–747, 348/778, 776; 319/382, 382.1; H04N 3/16, 9/30

(56) References Cited

U.S. PATENT DOCUMENTS 5,146,142 A * 9/1992 Van Tol ....................... 315/382

FOREIGN PATENT DOCUMENTS

| JP | 6-233152 | * | 8/1994 | ............ H04N/3/16 |
| JP | 409168103 A | * | 6/1997 | ............ H04N/3/26 |

* cited by examiner

Primary Examiner—David E. Harvey
(74) Attorney, Agent, or Firm—Rader, Fishman & Grauer, PLLC

(57) ABSTRACT

A rear-projection television set in which two different dynamic focusing waveforms are used. The first dynamic focusing waveform is used only to focus an electron beam in a CRT generating the blue component of the picture being displayed. The second dynamic focusing waveform is used to focus the electron beam in the CRTs generating the red and green components of the picture being displayed. In this way, the resulting picture is better focused without flare or blue edging and displays better color uniformity over the entirety of the television screen.

15 Claims, 4 Drawing Sheets

METHOD AND APPARATUS FOR CORRECTING COLOR COMPONENT FOCUSING IN A REAR-PROJECTION TELEVISION SET

FIELD OF THE INVENTION

The present invention relates to the field of projection television. More specifically, the present invention relates to the field of correcting the focus of individual color components of an image projected on a rear-projection television set.

BACKGROUND OF THE INVENTION

FIG. 1 illustrates the basic design of a rear-projection television. A rear-projection television set is so named because the images are projected on to the back of the screen, while viewers watch the front of the screen.

As shown in FIG. 1, the conventional rear-projection television includes a screen (101) on which the television picture is projected. In a color projection television, the television signal (107) is divided into three signals each carrying a different color component (red, green and blue) of the image to be shown on the television.

Behind the screen (101) are three display devices (102, 103 and 104) each of which receives one of the three color component signals of the television signal (107). Each of the display devices (102 to 104) displays a single-color picture which is the color component of the picture to be shown on the screen (101) that that display device (102 to 104) received.

The display devices (102, 103 and 104) may be, for example, cathode ray tubes (CRTs). In each CRT, an electron beam is selectively scanned across a layer of phosphor to cause the phosphor to emit light to a degree proportional to the intensity of the electron beam. By varying the intensity of the electron beam as it scans the phosphor, an image is made to appear.

Each display device (102, 103 and 104) is associated with an optical projection system (105) that projects the single color-image from the respective display device (102, 103 and 104) to the rear of the screen (101). With the three different color component images projected simultaneously and superimposed on the rear of the screen (101), the viewer in front of the screen (101) sees the composite, full-color picture.

Within each of the individual CRT display devices (102, 103 and 104), an electronic or dynamic focus is system is used to focus the electron beam, i.e. control the beam width, on the phosphor layer. The dynamic focus system includes a dynamic focus signal (108) that is provided to an electromagnetic grid of each of the cathode ray tubes of the display devices (102 to 104). As shown in FIG. 1, the same dynamic focus signal (108) is provided to all three of the display devices (102 to 104).

This dynamic focus signal (108) is a waveform with two parabolic components. One component is at the horizontal scan frequency of the television set, while the other component is at the vertical scan frequency.

An inherent characteristic of projection television sets is that the output of the blue CRT is lower, i.e., less intense, than that from the red and green CRTs. This distorts the color of the resulting picture. For example, a yellowish tint may be seen in portions of an image that should be white. It is also difficult to provide a-uniform white color, where appropriate, across the entire screen.

If these problems are addressed by driving the blue CRT harder to emit more blue light, the blue spot is quickly saturated. Therefore, there have been two conventional approaches to adding more blue. The first is to make the spot size of the electron beam in the blue CRT larger than that in the red or green CRTs. An equivalent alternative is to defocus the electron beam in the blue CRT. Both of these methods in combination have also been tried.

However, the enlarged or defocused blue spot becomes distorted in ways that are detrimental to the overall picture quality. Specifically, the overly large spot becomes two big and assumes an incorrect shape, particularly around the periphery of the phosphor screen. The result is poor uniformity of the color white across the screen and blue, hazy edges around objects.

Consequently, there is a need in the art for a method and apparatus which overcomes these problems. Specifically, there is a need for a dynamic focusing system that allows the additional strength in the blue image component to be achieved without causing the flare, lack of color uniformity and hazy edges that are characteristic of pictures produced by conventional projection systems.

SUMMARY OF THE INVENTION

It is an object of the present invention to meet the above-described needs and others. Specifically, it is an object of the present invention to provide an apparatus and method that allows the additional strength needed in the blue image component to be achieved without causing the flare, lack of color uniformity and hazy edges that are characteristic of pictures produced by conventional systems.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a projection television system with dynamic focusing of the electron beams in CRT display devices respectively producing three individual color components of a picture being displayed. The system preferably includes three display devices each of which displays a different color component of the picture being displayed; projection optical systems for projecting images displayed on the display devices to a display surface; a first dynamic, focus signal applied to a first of the three display devices; and a second dynamic focus signal, different from the first dynamic focus signal, applied to a second and a third of the three display devices. The first display device displays the blue color component of the picture being displayed. By providing a different dynamic focusing signal to the display device displaying the blue color component, the blue image can be separately dynamically focused to overcome the problems of the prior art as described above. Under the principles of the present invention, the first dynamic focus signal differs from the second dynamic focus signal by being of a lesser amplification level.

The television system of the present invention preferably also includes a voltage divider circuit for generating from a dynamic focus waveform, first and second output signals of different amplification levels. The first and second output signals are processed to produce the first and second dynamic focus signals. The first and second output signals are added to a DC voltage signal to generate the first and second dynamic focus signals.

Preferably, the second dynamic focus signal may have a different DC voltage level when applied to the second display device than when applied to the third display device. To this end, the system of the present invention preferably also includes a focus block circuit for adding a dynamic focus waveform at two different amplification levels to a DC voltage to generate the first and second dynamic focus signals. The focus block circuit individually controls a DC voltage level of three output signals such that the second dynamic focus signal may be provided at two different DC voltage levels for separate application to the second and third display devices.

The present invention-also encompasses a method of dynamically focusing the electron beams in three separate CRT display devices on which three individual color components of a picture being displayed on a projection television are generated before being projected so as to be superimposed on a display surface. The method may be described as applying a first dynamic focus signal to a first of the three display devices which displays a first color component of the picture, while applying a second dynamic focus signal, different from the first dynamic focus signal, to a second and a third of the three display devices displaying, respectively, second and third color components of the picture. The first display device displays a blue color component of the picture being displayed.

The present invention may also be described as a projection television system with dynamic focusing of three individual color components of a picture being displayed including three display devices each of which displays a different color component of the picture being displayed; and projection optical means for projecting images displayed on the display means to a display surface. A first dynamic focus signal, at a first amplification level and a first DC voltage level, is applied to a first of the three display means. A second dynamic focus signal, different from the first dynamic focus signal, at a second amplification level and a second DC voltage-level, is applied to a second of the three display means. And, a third dynamic focus signal, at the second amplification level and a third DC voltage level, is applied to a third of the three display means. The first display device is the one that displays the blue color component of the picture being displayed.

As before, the first dynamic focus signal differs from the second and third dynamic focus signals by being of a lesser amplification level. The system may include a voltage divider for generating from a dynamic focus waveform, first and second output signals of different amplification levels. The first and second output signals are then processed to produce the first, second and third dynamic focus signals. The first and second output signals are added to a DC voltage signal to generate the first, second and third dynamic focus signals.

Finally, the system of the present invention may include a circuit for adding a dynamic focus waveform at two different amplification levels to a DC voltage to generate the first, second and third dynamic focus signals. This circuit individually controls a DC voltage level of the first, second and third dynamic focus signals.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
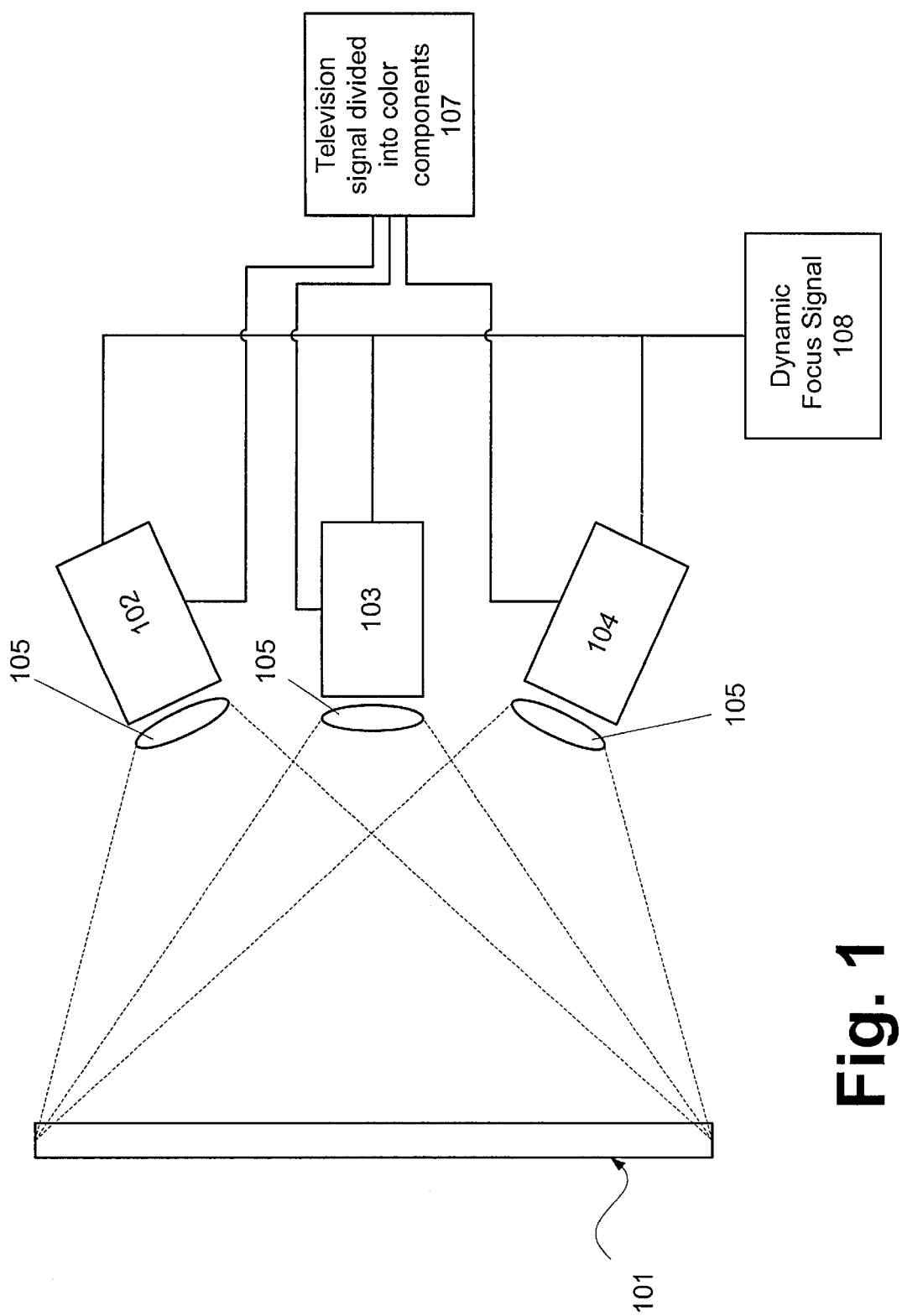
FIG. 1 is an illustration of a rear-projection television set.
Figure 2:
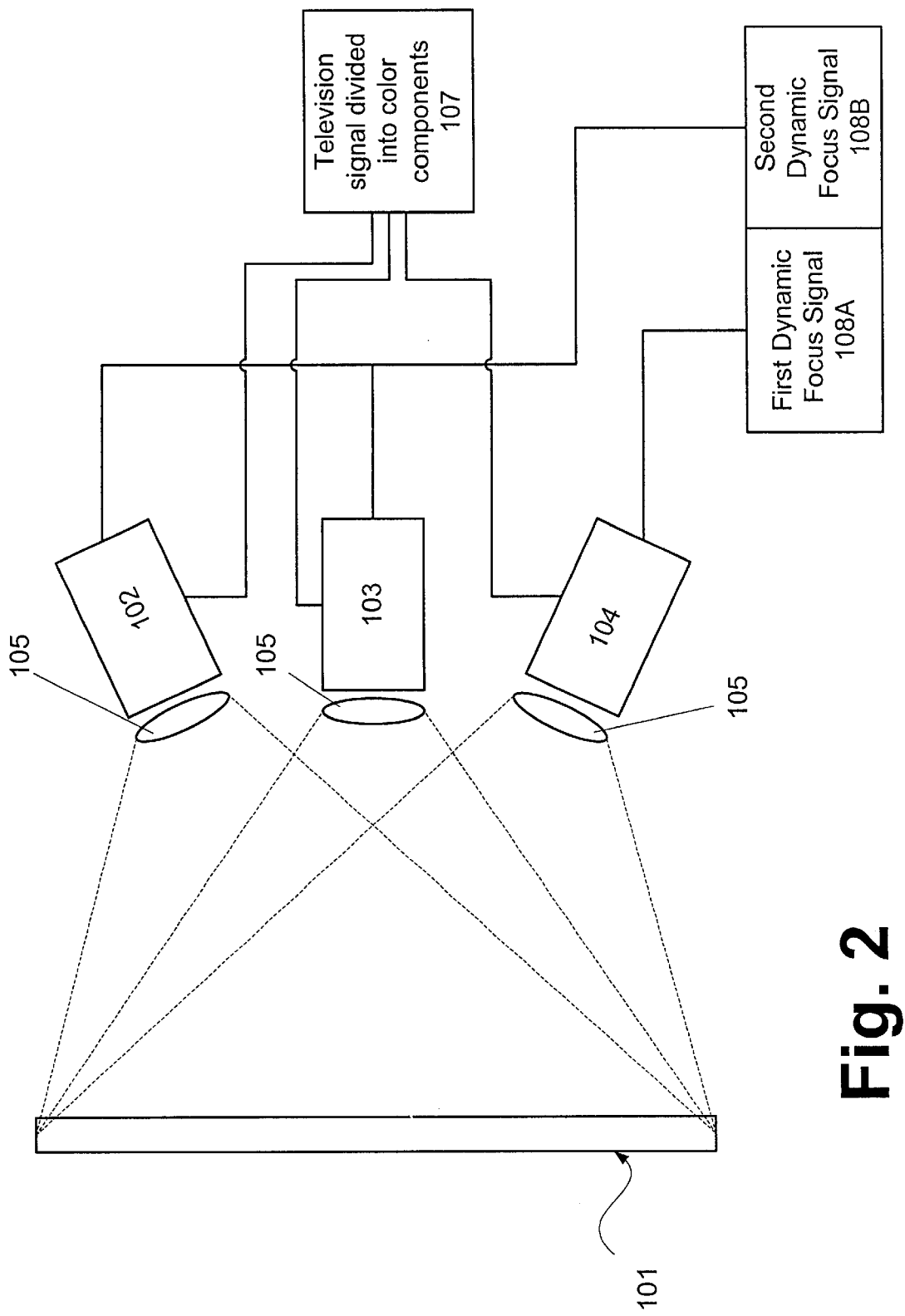
FIG. 2 is an illustration of a rear-projection television set according to the present invention.

FIG. 2 illustrates a rear-projection television set according to the present invention. Elements which are the same as those illustrated in FIG. 1 are identically numbered and a detailed description of those elements is omitted.

In the rear-projection television set of FIG. 2, display device (104) is the display device that receives a blue color component of the image to be displayed on the screen (101). As shown in FIG. 2, the present invention provides two different dynamic focus signals. A first dynamic focus signal (108A) is provided only to the display device (104) displaying the blue component of the image. A second dynamic focus signal (108B) is provided to the display devices (103 and 102) which project the red and green components of the image being displayed.

As will be understood-by those of skill in the art, the display devices (102, 103 and 104) are typically CRT devices with the respective dynamic focus signals (108A and 108B) being applied to the grids of the display devices to separately dynamically focus the electron beams of the display devices (102, 103 and 104).

The inventors herein have discovered that by separately amplifying the first dynamic focus signal (108A) which is provided to dynamically focus the electron beam in the display device (104) that is displaying the blue color component of the image being displayed, the overall clarity and uniformity of the image across the entirety of the screen (101) can be improved. The specific modifications to the first dynamic focus signal (108A) and the circuits for making those modifications will be described in detail below.

Figure 3:
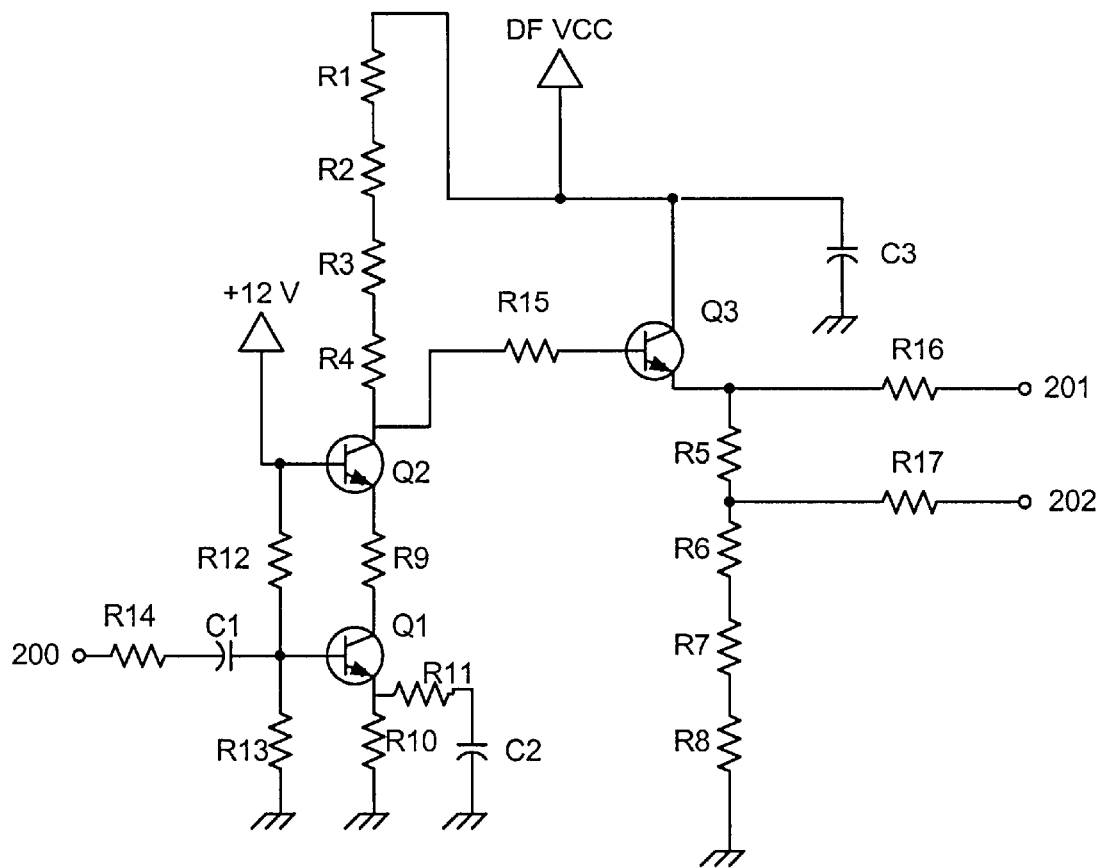
FIG. 3 is a circuit that buffers and amplifies a dynamic focus waveform to output two dynamic focusing waveforms according to the principles of the present invention.

The first dynamic signal (108A) is a reduced amplified level signal as compared with the second dynamic signal (108B). FIG. 3 illustrates a circuit for generating the first and second dynamic focus signals.

As shown in FIG. 3, a buffered dynamic focus waveform is provided through terminal (200). This waveform has two parabolic components. One component is at the horizontal scan frequency of the television set, while the other component is at the vertical scan frequency.

A dynamic focusing voltage (DF VCC) is also provided to the circuit. The dynamic focusing voltage (DF VCC) is provided through a transistor (Q3) to a voltage divider circuit comprising resistors (R5, RG, R7 and R8). The transistor (Q3) is driven by the waveform (200) through a circuit including two additional transistors (Q1 and Q2) and a 12 V voltage source (+12 V).

The voltage divider circuit provides two output signals (201 and 202w at different amplification levels. These two output signals (201 and 202) form the basis for the first and second dynamic focus signals (108A and 108B).

Figure 4:
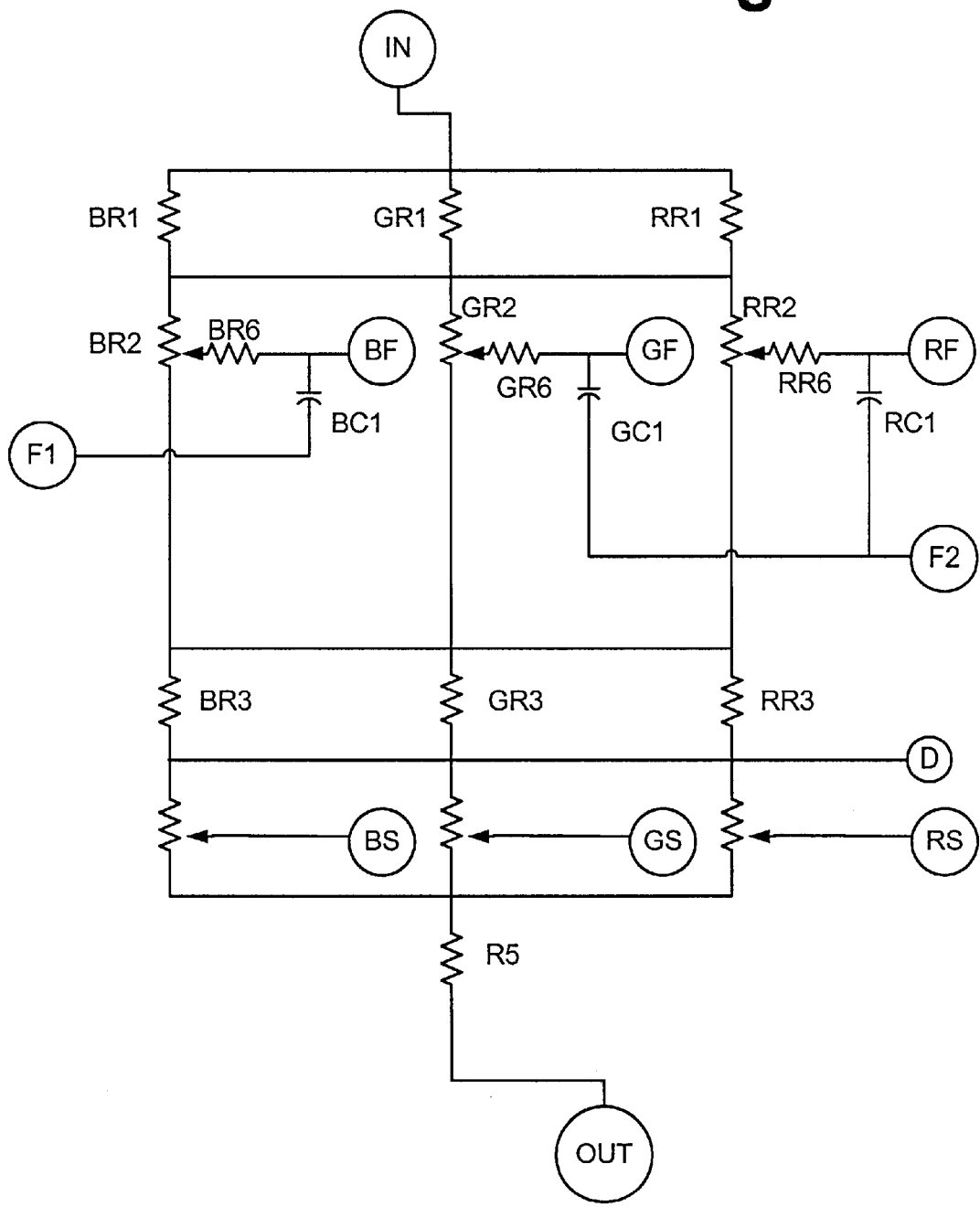
FIG. 4 is a focus block circuit that accepts the two dynamic focusing waveforms from the circuit of FIG. 3 and adds those signals to a large DC voltage to generate two different dynamic focusing signals for use in a rear projection television.

FIG. 4 illustrates a focus block circuit that receives the output signals (201 and 202) from the circuit of FIG. 3. The purpose of the focus block circuit of FIG. 4 is to add the dynamic focus waveforms provided by the circuit of FIG. 3 to a relatively large DC voltage so as to generate the first and second dynamic focus signals (108A and 108B).

The first dynamic focus waveform (201) is input to the focus block circuit through terminal (F2). The second dynamic focus waveform (202) is input to the focus block circuit through a separate terminal (F1).

A DC voltage to which the dynamic focus waveforms (201 and 202) will be added is provided across the terminals (IN) and (OUT) in. FIG. 4. To optimize the focus of each color component, the DC voltage of the dynamic focus signal provided to each of the three display devices (102 to 104) may be separately adjusted. For this purpose, the focus block circuit of FIG. 4 includes three terminals (BF, GF and RF) controlling respective potentiometers (BR2, GR2 and RR2). By controlling these potentiometers (BR2, GR2 and RR2), the DC level of the three *dynamic focus signals (BS, GS and RS) output by the focus block circuit can be individually controlled.

The dynamic focus signals (BS, GS and RS) output by the focus block circuit of FIG. 4 are respectively provided to the electromagnetic grids of the display devices (104, 103 and 102). The dynamic focus signal (ES) goes to the display device (104) displaying the blue component of the picture signal. The dynamic focus signals (GS and RS) go respectively to the display devices (103 and 102) displaying the green and red components of the picture signal.

The amplification level of the signal (BS) is different from that of the signals (GS and RS). The, amplification level of the signals (GS and RS) is the same, but the DC voltage level of the signals (GS and RS) may be individually adjusted, as may the DC voltage level of the signal (BS).

With the present invention, a rear-projection television set can be achieved in which the blue component of the picture is better focused over the entirety of the screen, reducing blue spot size and flare. This results in-an improved picture quality that is not possible with conventional projection television.

The preceding description has been presented only to illustrate and describe the invention. It is not intended to be exhaustive or to limit the invention to any precise form disclosed. Many modifications and variations are possible in light of the above teaching. For example, the principles of the present invention could just as well be applied to a front-projection television or projection display system as to the rear-projection system described above.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A projection television system with dynamic focusing of three individual color components of a picture being displayed comprising:
   three display devices each of which displays a different color component of said picture being displayed;
   projection optical systems for projecting images displayed on said display devices to a display surface;
   a first dynamic focus signal applied to a first of said three display devices; and
   a second dynamic focus signal, different from said first dynamic focus signal, applied to a second and a third of said three display devices;
   said first dynamic focus signal differing from said second dynamic focus signal by being of a lesser amplification level.

2. The projection television system of claim 1, wherein said first display device displays a blue color component of said picture being displayed.

3. The projection television system of claim 1, further comprising a voltage divider circuit for generating from a dynamic focus waveform, first and second output signals of different amplification levels, wherein said first and second output signals are processed to produce said first and second dynamic focus signals.

4. The projection television system of claim 3, wherein said first and second output signals are added to a DC voltage signal to generate said first and second dynamic focus signals.

5. The projection television system of claim 1, wherein said second dynamic focus signal may have a different DC voltage level when applied to said second display device than when applied to said third display device.

6. The projection television system of claim 5, further comprising a focus block circuit for adding a dynamic focus waveform at two different amplification levels to a DC voltage to generate said first and second dynamic focus signals; wherein said focus block circuit individually controls a DC voltage level of three output signals such that said second dynamic focus signal may be provided at two different DC voltage levels for separate application to said second and third display devices.

7. The projection television system of claim 1, wherein:
   said first dynamic focus signal is at a first amplification level, said first dynamic focus signal being applied to said first of said three display devices at a first DC voltage level; and
   said second dynamic focus signal is at a second amplification level, said second dynamic focus signal being applied to said second of said three display devices at a second DC voltage level, and being applied to said third of said three display devices at a third DC voltage level.

8. The projection television system of claim 7, further comprising:
   a voltage divider circuit, said voltage divider circuit generating said first and second dynamic focus signals.

9. The projection television system of claim 7, further comprising:
   a first adjustment circuit for adjusting said first DC voltage level;
   a second adjustment circuit for adjusting said second DC voltage level; and
   a third adjustment circuit for adjusting said third DC voltage level.

10. A method of dynamically focusing three individual color components of a picture being displayed on a projection television in which three different color components of said picture are displayed respectively on three separate display devices and projected so as to be superimposed on a display surface, the method comprising applying a first dynamic focus signal to a first of said three display devices which displays a first color component of said picture, while applying a second dynamic focus signal, different from said first dynamic focus signal, to a second and a third of said three display devices displaying, respectively, second and third color components of said picture,
   said first dynamic focus signal being generated at a lesser amplification level than that of said second dynamic focus signal.

11. The method of claim 8, wherein said first display device displays a blue color component of said picture being displayed.

12. The method of claim 10, wherein said generating first and second dynamic focus signals is performed with a voltage divider circuit for generating, from a dynamic focus waveform, first and second output signals of different amplification levels, wherein said first and second output signals are processed to produce said first and second dynamic focus signals.

13. The method of claim 12, further comprising adding said first and second output signals to a DC voltage signal to generate said first and second dynamic focus signals.

14. The method of claim 10, further comprising providing said second dynamic focus signal with a different DC voltage level when applied to said second display device than when applied to said third display device.

15. The method of claim 14, individually controlling a DC voltage level of three output signals from a focus block circuit such that said second dynamic focus signal may be provided at two different DC voltage levels for separate application to said second and third display devices.

* * * * *